Patented Feb. 13, 1923.

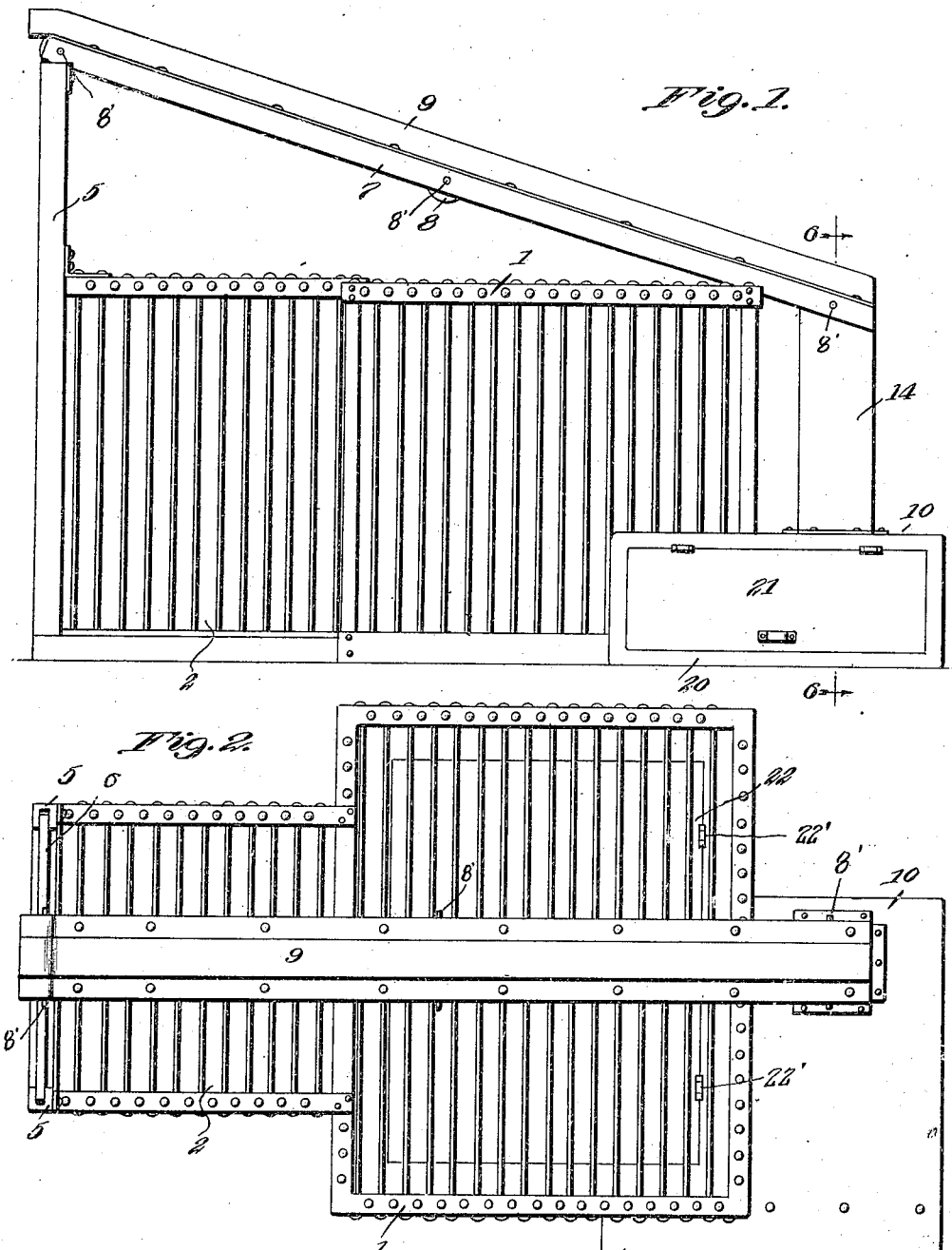

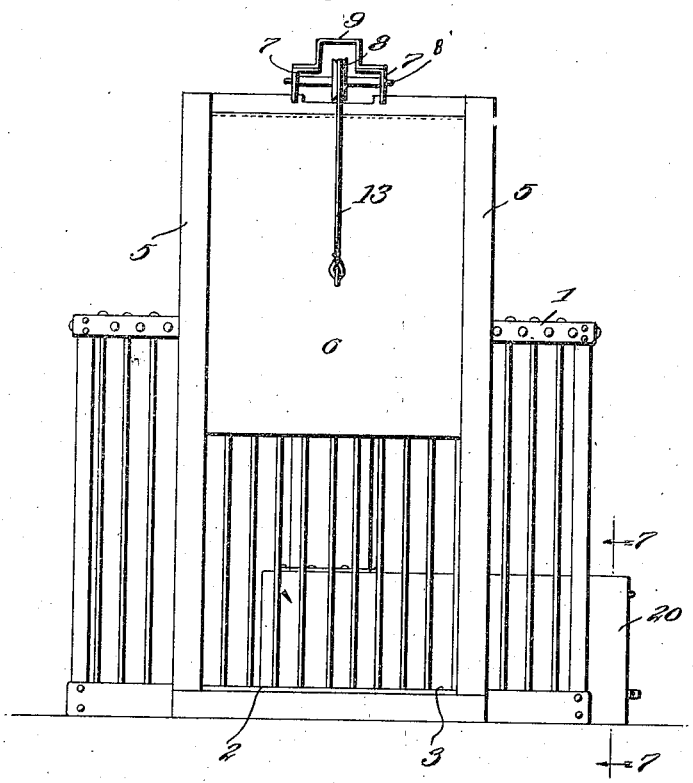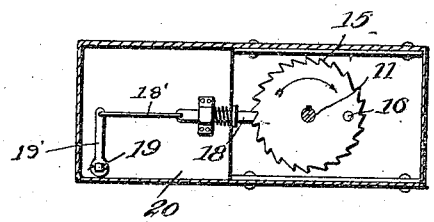

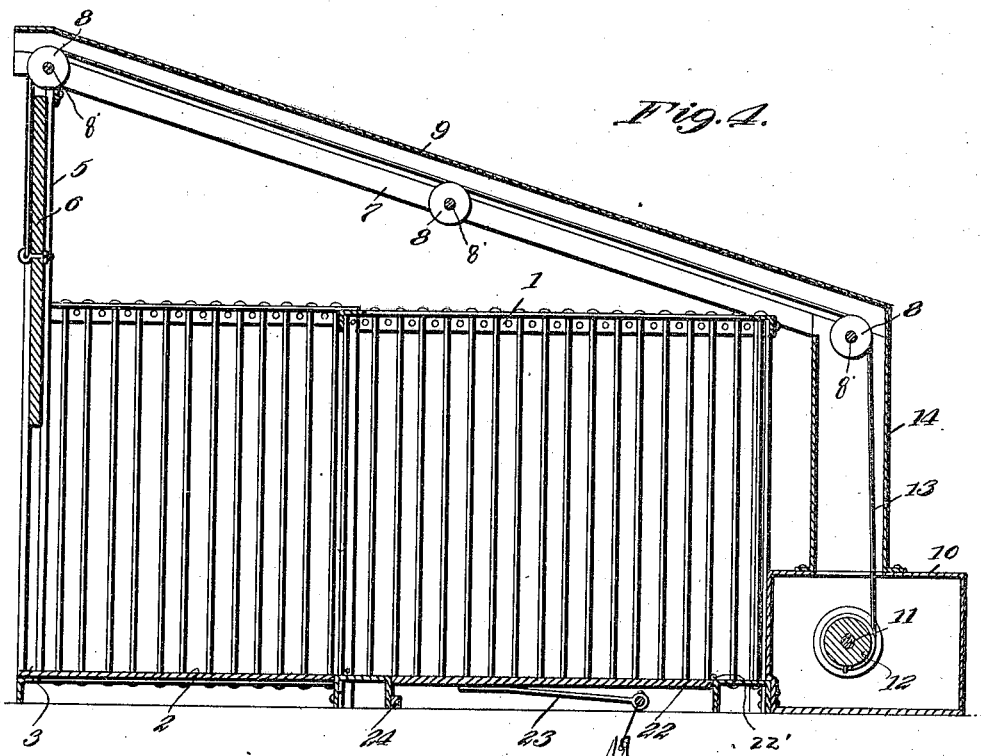
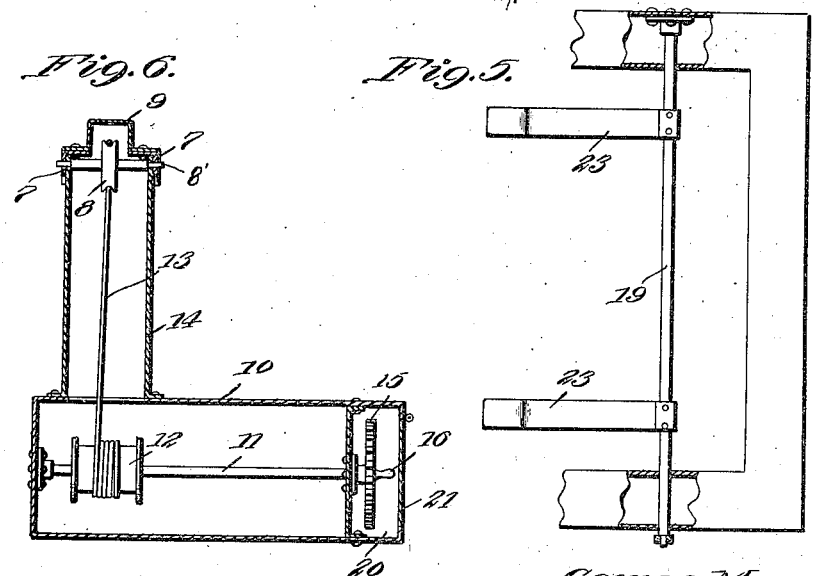

1,445,153

UNITED STATES PATENT OFFICE.

GEORGE MEZEI, OF CLINCHCO, VIRGINIA.

TRAP.

Application filed August 18, 1922. Serial No. 582,758.

*To all whom it may concern:*

Be it known that I, GEORGE MEZEI, a citizen of Hungary, residing at Clinchco, in the county of Dickenson and State of Virginia, have invented new and useful Improvements in Traps, of which the following is a specification.

This invention relates to an animal trap, the general object of the invention being to provide a trap for catching the animal alive and the trigger of which is operated by a movable platform in the trap which is depressed by the weight of the animal.

Another object of the invention is to provide a winding device which is attached to the trap door by a cable so that the door can be raised by rotating the device with trigger means, actuated by the before mentioned platform, for holding the device against retrograde movement.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of a trap constructed in accordance with my invention.

Figure 2 is a plan view thereof.

Figure 3 is a front view thereof.

Figure 4 is a longitudinal sectional view.

Figure 5 is a horizontal sectional view.

Figures 6, and 7 are detail sectional views taken along the lines 6—6 of Figure 1 and 7—7 of Figure 3, respectively.

In these views 1 indicates the body of the trap and 2 a passageway leading thereinto. A door 3 is arranged at the front of the passageway, said door consisting of a frame having the guideways 5 therein. A trap door 6 is vertically movable in said guideways. A frame 7 extends from the top of the door frame to the rear of the trap and said frame carries the guide rollers 8 which are carried by the shafts 8'. The frame is provided with a top 9. A casing 10 is located at the rear of the trap and a shaft 11 is journaled in said casing. A drum 12 is located on said shaft and a cable 13 has one end connected with the drum and its other end with the door, the cable passing over the rollers, as shown. A casing 14 encloses the vertical part of the cable and rests upon the casing at the rear of the trap. A ratchet wheel 15 is connected with the outer end of the shaft, said wheel being provided with a handle 16 by which it may be turned in order to wind the cable upon the drum. A pawl 18 is connected by a link 18' with an arm 19' of a rock shaft 19 which is carried by the under frame of the trap and this pawl is adapted to engage the ratchet wheel 16 to hold the same against retrograde movement. The ratchet wheel and pawl are arranged in a casing 20 which is provided with a hinged door 21. The bottom of the trap is formed in part of a hinged platform 22 and the shaft 19 is provided with arms 23 for engaging the bottom of the platform to hold the same in raised position in a certain position of the rock shaft. The hinges for the platform are shown at 22'. A stop bar 24 is provided for limiting the downward movement of the platform and arm.

When the trap is to be set the drum is turned by means of the handle on the ratchet wheel so as to wind the cable thereupon and thus raise the trap door. The bait can be placed in any suitable part of the body of the trap to attract the animal thereto. The pawl is placed in engagement with the ratchet wheel to hold the parts in wound up condition. This will act to hold the platform in raised position. When an animal enters it will pass through the passage into the body of the trap and as soon as it places its weight on the platform the same will be forced downwardly thus rocking the rock shaft and releasing the pawl from the ratchet wheel. This will permit the cable to unwind from the drum under the weight of the trap door and thus the animal will be caught in the trap.

The trap can be made of any size to catch small animals or large animals.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A trap of the class described comprising a body and a passage leading to the same, a door frame at the front end of the passage, a door vertically movable in said frame, a frame extending from the top of the door frame to the rear part of the trap, rollers carried by said frame, a casing at the rear of the trap, a shaft mounted in the casing, a drum on the shaft, a cable connected with the drum and with the trap door and passing over the rollers, a ratchet wheel on the shaft, a handle on the ratchet wheel, a rock shaft, a pawl thereon engaging the ratchet wheel, an arm on the shaft and arranged under the body and a hinged platform forming part of the bottom of the trap and adapted to engage the arm to tilt the rock shaft when the weight of the animal comes thereupon.

In testimony whereof I affix my signature.

GEORGE MEZEI.